United States Patent
Pang et al.

(10) Patent No.: US 11,256,723 B2
(45) Date of Patent: Feb. 22, 2022

(54) PESTICIDE RESIDUE DETECTION DATA PLATFORM BASED ON HIGH RESOLUTION MASS SPECTRUM, INTERNET AND DATA SCIENCE, AND METHOD FOR AUTOMATICALLY GENERATING DETECTION REPORT

(71) Applicants: CHINESE ACADEMY OF INSPECTION AND QUARANTINE, Beijing (CN); BEIJING TECHNOLOGY AND BUSINESS UNIVERSITY, Beijing (CN); BEIJING UNI-STAR INSPECTION TECHNOLOGY CO., LTD., Beijing (CN)

(72) Inventors: Guofang Pang, Beijing (CN); Yi Chen, Beijing (CN); Chunlin Fan, Beijing (CN); Xiaobo Zou, Beijing (CN); Yuehong Sun, Beijing (CN); Qiaoying Chang, Beijing (CN); Kun Hou, Beijing (CN); Bing Fang, Beijing (CN); Ruobin Bai, Beijing (CN)

(73) Assignees: CHINESE ACADEMY OF INSPECTION AND QUARANTINE; BEIJING TECHNOLOGY AND BUSINESS UNIVERSITY; BEIJING UNI-STAR INSPECTION TECHNOLOGY CO., LTD.

( * ) Notice: Subject to any disclaimer, the term of this patent is extended or adjusted under 35 U.S.C. 154(b) by 132 days.

(21) Appl. No.: 16/311,594

(22) PCT Filed: Apr. 13, 2018

(86) PCT No.: PCT/CN2018/082954
§ 371 (c)(1),
(2) Date: Dec. 19, 2018

(87) PCT Pub. No.: WO2018/192418
PCT Pub. Date: Oct. 25, 2018

(65) Prior Publication Data
US 2020/0042540 A1    Feb. 6, 2020

(30) Foreign Application Priority Data
Apr. 17, 2017    (CN) .......................... 2017 1 0249874

(51) Int. Cl.
G06F 16/28    (2019.01)
G06F 16/25    (2019.01)
(Continued)

(52) U.S. Cl.
CPC ....... G06F 16/285 (2019.01); G01N 30/7206 (2013.01); G01N 30/7233 (2013.01);
(Continued)

(58) Field of Classification Search
CPC ...... G06F 16/285; G06F 16/25; G06F 16/283; G06F 16/248; G01N 30/7206;
(Continued)

(56) References Cited

U.S. PATENT DOCUMENTS

2003/0023386 A1    1/2003    Aranibar et al. ............... 702/19

FOREIGN PATENT DOCUMENTS

| CN | 1543784 | 11/2004 | ............. A01M 7/00 |
| CN | 102629271 | 8/2012 | ............. G06F 17/30 |

(Continued)

OTHER PUBLICATIONS

Derek Farnsworth, Maximum Residue Limits: Protectionism or Food Safety?, Aug. 12-14, 2012, University of California, Davis Department of Agricultural and Resource Economics, Agricultural & Applied Economics Association's 2012 AAEA Annual Meeting, Seattle, Washington, pp. 1-31 (Year: 2012).*

(Continued)

Primary Examiner — Pierre M Vital
Assistant Examiner — Alicia M Antoine
(74) Attorney, Agent, or Firm — Hayes Soloway P.C.

(57) ABSTRACT

Disclosed is a pesticide residue detection data platform based on high resolution mass spectrum, the Internet and data science, and a method for automatically generating a detection report. The platform includes allied laboratories, a detection result database of the allied laboratories, four basic sub-databases, a data collection system and an intelligent (Continued)

data analysis system. The intelligent analysis system reads data according to conditions set by a user, performs various statistical analyses according to a statistical analysis model, generates charts, obtains a comprehensive conclusion, and returns an analysis result to the client ends of the allied laboratories.

13 Claims, 9 Drawing Sheets

(51) Int. Cl.
G06F 16/248 (2019.01)
G01N 30/72 (2006.01)
G01N 30/88 (2006.01)
G06Q 50/26 (2012.01)

(52) U.S. Cl.
CPC .......... *G01N 30/88* (2013.01); *G06F 16/248* (2019.01); *G06F 16/25* (2019.01); *G06F 16/283* (2019.01); *G06Q 50/26* (2013.01); *G01N 2030/8804* (2013.01)

(58) Field of Classification Search
CPC .............. G01N 30/7233; G01N 30/88; G01N 2030/8804; G06Q 50/26

USPC ...................................................... 707/603
See application file for complete search history.

(56) References Cited

FOREIGN PATENT DOCUMENTS

| CN | 104722569 A | * | 6/2015 | |
|----|-------------|---|--------|---|
| CN | 105027113 A | * | 11/2015 | ............ G16H 40/20 |
| CN | 105404643 | | 3/2016 | ............ G06F 17/30 |
| CN | 107103571 | | 8/2017 | ............ G06Q 50/26 |

OTHER PUBLICATIONS

Bulbul, Gonca, Akhtar Hayat, Silvana Andreescu, "Portable Nanoparticle-Based Sensors for Food Safety Assessment", Dec. 5, 2015, pp. 30736-30758 (Year: 2015).*

International Search Report (w/translation) and Written Opinion (no translation) issued in application No. PCT/CN2018/082954, dated Jul. 18, 2018 (11 pgs).

Pang et al., "Tri-element Integrated Technology of High Resolution MS, Internet, and Digital Science Constitutes Technical Platform for Pesticide Residues," Bulletin of Chinese Academy of Sciences, Dec. 20, 2017, 32(12), pp. 1384-1396, with machine translated abstract and summary (16 pgs).

* cited by examiner

Contents

Part I. Report of pesticide residues in 430 commercial fruit and vegetables samples detected by LC-Q-TOF/MS in Chongqing (Apr. 2014)

1 Sample species, quantities and sources ··················· 1

1.1 Sample acquisition and detection ···················· 1

1.2 Detection results ············································· 3

1.2.1 Sample detection situation at the sampling locations ··· 3

1.2.2 Total quantity of detected pesticide species and detected frequency ···················································· 4

1.2.3 Detected pesticide species in individual samples and proportions ······················································· 5

1.2.4 Detected pesticide categories and proportions ·········· 6

1.2.5 Detected pesticide residual levels ························ 6

1.2.6 Toxicity categories of detected pesticides, detected frequencies, out-of-specification frequencies, and proportions ······················································· 7

1.2.7 Detected species of vitally toxic/highly toxic pesticides and detected frequencies ········································ 8

2 Comparative analysis of detected levels of pesticide residues vs. MRLs ············································· 10

2.1 Analysis of out-of-specification pesticide samples ······ 11

2.2 Analysis of out-of-specification pesticide species ······· 12

2.2.1 Measurement as per China MRL standard ············· 12

2.2.2 Measurement as per EU MRL standard ················ 13

2.2.3 Measurement as per Japan MRL standard ············· 15

2.2.4 Measurement as per Hong Kong of China MRL standard ··························································· 17

2.2.5 Measurement as per US MRL standard ················ 17

2.2.6 Measurement as per CAC-MRL standard ············· 18

2.3 Analysis of out-of-specification situation at 20 sampling locations ·························································· 18

2.3.1 Measurement as per China MRL standard ············· 18

2.3.2 Measurement as per EU MRL standard ················ 19

2.3.3 Measurement as per Japan MRL standard ············· 22

2.3.4 Measurement as per Hong Kong of China MRL standard ··························································· 24

2.3.5 Measurement as per US MRL standard ················ 24

2.3.6 Measurement as per CAC-MRL standard ············· 25

3 Distribution of pesticide residues in fruits ··············· 26

3.1 Top 10 fruits in which the number of detected pesticide species and detected frequency are the highest ············ 26

3.2 Top 10 fruits in which the number of out-of-specification pesticide species and detected frequency are the highest ···· 26

3.3 Analysis of fruit samples in which the pesticide residue detection rate is higher ········································· 27

3.3.1 Grape ······················································· 27

3.3.2 Musk melon ··············································· 28

3.3.3 Peach ······················································· 29

4 Distribution of pesticide residues in vegetables ········· 30

4.1 Top 10 vegetables in which the number of detected pesticide species and detected frequency are the highest ···· 30

4.2 Top 10 vegetables in which the number of out-of-specification pesticide species and detected frequency are the highest ··························································· 31

Fig. 7

4.3 Analysis of vegetable samples in which the pesticide residue detection rate is higher ............ 31

4.3.1 Tomato ............ 31

4.3.2 Pepper ............ 33

4.3.3 Cucumber ............ 34

5 Preliminary conclusion ............ 36

5.1 Percent of pass of commercial fruits and vegetables in Chongqing measured as per China and major international MRL standards ............ 36

5.2 The detected pesticides in commercial fruits and vegetables in Chongqing are mainly moderately toxic, low toxic or slightly toxic pesticides, and those fruits and vegetables account for 96.2% of the fruits and vegetables in the market ............ 37

5.3 Attention should be paid to the phenomena of detected vitally toxic, highly toxic, and prohibited pesticides ......... 38

5.4 A deep gap between the MRL standard in China and the MRL standards in advanced countries exists ............ 38

5.5 7-23 species of pesticide residues are detected in individual samples of fruits and vegetables, posing a question on the scientificaalness of pesticide use ............ 38

Table 1. Raw Detection Result Data ............ 41

Table 2. Concentration Distribution in the Detection Result of 53 Species of Pesticides in 430 Samples in 20 Lots ......... 69

Table 3. Detection Results of 53 Species of Pesticides in 430 Samples in 20 Lots (with Reference to China MRL Standard) 94

Table 4. Detection Results of 53 Species of Pesticides in 430 Samples in 20 Lots (with Reference to EU MRL Standard) 124

Table 5. Detection Results of 53 Species of Pesticides in 430 Samples in 20 Lots (with Reference to Japan MRL Standard) 154

Table 6. Detection Results of 53 Species of Pesticides in 430 Samples in 20 Lots (with Reference to Hong Kong MRL Standard) ............ 183

Table 7. Detection Results of 53 Species of Pesticides in 430 Samples in 20 Lots (with Reference to US MRL Standard) 212

Table 8. Detection Results of 53 Species of Pesticides in 430 Samples in 20 Lots (with Reference to CAC-MRL Standard) 242

Table 9. Statistics on Pesticide Contamination Situation (with Reference to China MRL Standard) ............ 272

Table 10. Statistics on Pesticide Contamination Situation (with Reference to EU MRL Standard) ............ 273

Table 11. Statistics on Pesticide Contamination Situation (with Reference to Japan MRL Standard) ............ 274

Table 12. Statistics on Pesticide Contamination Situation (with Reference to Hong Kong of China MRL Standard) .. 275

Table 13. Statistics on Pesticide Contamination Situation (with Reference to US MRL Standard) ............ 276

Table 14. Statistics on Pesticide Contamination Situation (with Reference to CAC-MRL Standard) ............ 277

Table 15. Summary of Out-Of-Specification Pesticide Information (with Reference to China MRL Standard) ..... 278

Table 16. Summary of Out-Of-Specification Pesticide Information (with Reference to EU MRL Standard) ........ 279

Table 17. Summary of Out-Of-Specification Pesticide Information (with Reference to Japan MRL Standard) ...... 289

Table 18. Summary of Out-Of-Specification Pesticide Information (with Reference to Hong Kong of China MRL Standard) ............ 295

Table 19. Summary of Out-Of-Specification Pesticide Information (with Reference to US MRL Standard) ......... 296

Table 20. Summary of Out-Of-Specification Pesticide Information (with Reference to CAC-MRL Standard) ...... 297

Fig. 7 (continued)

PESTICIDE RESIDUE DETECTION DATA PLATFORM BASED ON HIGH RESOLUTION MASS SPECTRUM, INTERNET AND DATA SCIENCE, AND METHOD FOR AUTOMATICALLY GENERATING DETECTION REPORT

TECHNICAL FIELD

This invention presents a method for online tracing and warning of pesticide residues in agricultural products, and more particularly to a pesticide residue detection data platform and automatic generation method of detection report based on the ternary integration technique which consists of high-resolution mass spectrometry, Internet, and data science interdisciplinary techniques.

BACKGROUND ART

At present, in pesticide residue detection reports published by quality supervision departments, the detection data is mainly represented by data tables and only a few statistical charts. Generation of these reports takes time and is not terribly timely. Moreover, statistical data and charts are difficult to understand for the public, and lacks timely management and early warning functions. In addition, as non-target pesticide residue detection techniques are implemented in a high degree of digitization, informatization and automation, massive analytical data have been generated, which is also a challenge to traditional data statistics and analysis methods. Therefore, it is urgent to develop a system which can provide innovative big data acquisition, transmission, statistics and intelligent analysis. In recent years, with the development of electronic information and Internet, new approaches and methods are provided for multi-dimensional expression, sharing and analysis of big data of pesticide residue detection.

It is desirable to construct a pesticide residue detection data platform based on interdisciplinary integration of Internet, advanced high-resolution mass spectrometry, and data science to realize timely acquisition, management and intelligent analysis of pesticide residues data, generate pesticide residue detection reports automatically in a short time, provide real-time online service for the traceability and risk assessment of pesticide residue, to realize scientific management and use of pesticides. However, until now, no such method and system exists.

CONTENTS OF THE INVENTION

The invention presents a ternary interdisciplinary integration technique, which consists of high-resolution mass spectrometry, Internet, and data science, to construct a pesticide residue detection data platform and present an automatic detection report generation method. In laboratory coordination based on Internet and distributed in China, more than 1,200 pesticides commonly used are screened continuously in different fruits and vegetables during the year. Databases are established through pesticide residue detection data acquisition to achieve intelligent management and analysis of data, and to automate report generation.

The present invention "pesticide residue detection data platform construction and automatic detection report generation method based on the ternary integration technique of a high-resolution mass spectrometry, Internet, data science" proposes four major parts: ① establishing laboratory coordination and pesticide residue detection standard methods; ② establishing a laboratory coordination detection result database and four basic sub-databases; ③ establishing a pesticide residue data acquisition system; and ④ establishing an intelligent analysis system of pesticide residue data.

The first part of this invention is to establish laboratory coordination and standard pesticide residue detection method. The establishment of laboratory coordination refers to establishing laboratory coordination across the country, which are operated under five uniform criteria (uniform sampling, unified sample preparation, uniform detection method, uniform format data uploading, and uniform format statistical analysis report) in a closed system to detect pesticide residues in fruits and vegetables on the market throughout the country all year. The pesticide residue data detection methods employ Liquid Chromatography-Quadrupole-Time of Flight/Mass Spectrometry (LC-Q-TOF/MS) and Gas Chromatography-Quadrupole-Time of Flight/Mass Spectrometry (GC-Q-TOF/MS) techniques to detect pesticide residues in fruits and vegetables to obtain relevant raw data of pesticide residues.

The second part of this invention is to establish a laboratory coordination detection result database and four basic sub-databases. The coordinated laboratory detection result database includes names of pesticides, names of agricultural products, sampling time, sampling locations, detection methods, and detection organizations, etc. The four basic sub-databases include a multi-country MRLs database, an agricultural product category database, a pesticide information database, and a geographic information database. The multi-country MRLs database contains 241,527 items of relevant MRLs, criteria from different counties or regions, such as China, Hong Kong of China, United States, European Union, Japan and the Codex Alimentarius Commission (CAC). It includes the pesticides, agricultural products, maximum residue limits (MRLs), and the criteria-setting countries or organizations. The agricultural product category database mainly contains the category criteria in China, Hong Kong of China, US, EU, Japan, and the Codex Alimentarius Commission (CAC). It mainly comprises name of agricultural products, primary category, secondary category, and tertiary category, etc. The pesticide information database includes their basic information such as toxicity, function, chemical composition, prohibition, and derivatives. It specifically comprises name, CAS registry number, toxicity intensities of the pesticides, whether the pesticides are metabolic compounds and their metabolic precursors or not, and whether the pesticides are prohibited in the criteria or not. The geographic information database covers required geographical scopes, and comprises detailed address of all sampling locations in provincial, regional, and county-level administrative division, etc.

The third part of this invention is to establish a data acquisition system. Three-layer architecture based on "browser/Web server/database server" comprises a data acquisition module, a data preprocessing module, a contamination level judgment module, and a data storage module. The browser layer is in the clients of the coordinated laboratories and is an interface for the users to access the system. The Web server layer is located in a data center and is responsible for accessing the databases and executing preprocessing logics. The database server is located in a data center and is responsible for storing and managing various kinds of data. The functions of all modules in the acquisition system are as follows: (1) the data acquisition module is responsible for acquiring pesticide residue detection results reported by the coordinated laboratories; (2) the data preprocessing module is responsible for processing the reported detection data, including judgment of reported data, and supplementation, categorization and merging for the information of pesticide, region, and agricultural product category, etc.; (3) the contamination level judgment module is responsible for judging contamination levels according to the MRLs in different countries (or regions, or organizations); (4) the data storage module is responsible for storing records of final results into the databases.

The fourth part of this inventions is to create an intelligent data analysis system, which mainly establishes the link and communication among the detection result database and the four sub-databases, and realizes multi-dimensional cross analysis of sampling locations, pesticides, agricultural products, and contamination levels according to statistical analysis models. The system is also based on the three-layer architecture of "browser/Web server/database server", and comprises a parameter setting module, a single item analysis module, a comprehensive analysis module, a report generation module, a table generation module, and a prewarning reporting module. The browser layer is in the clients of the coordinated laboratories and is an interface for the users to access the system, set statistical parameters, and download statistical results. The Web server layer is also located in the data center and is responsible for accessing the databases and executing various statistical analysis logics. The database server is located in the data center and is responsible for storing and managing various pesticide residue data. The functions of all modules in the intelligent data analysis system are as follows: (1) the parameter setting module is responsible for providing interface and channel to set parameter for the users; (2) the single item analysis module is responsible for accomplishing 18 individual statistics functions; (3) the comprehensive analysis module is responsible for accomplishing 5 comprehensive analysis tasks based on individual analysis result; (4) the report generation module is responsible for generating detection reports that contain text and charts from the analytical results; (5) the table generation module is responsible for generating various statistical tables; (6) the warning reporting module provides warning prompts according to the analytical results.

Beneficial Effects of this Invention

The platform construction and automatic detection report generation method presented in this invention provides an efficient and accurate data analysis platform for pesticide residue data analysis and pre-warning in China. The coordinated laboratories and the united pesticide residue detection methods guarantee uniformity, integrality, accuracy, security, and reliability of data. The establishment of coordinated laboratories detection result databases and four basic sub-databases provides basis for pesticide residue detection data analysis and contamination level judgment. The presented pesticide residue data acquisition system provides automatic uploading of detection results, data preprocessing, and contamination level judgment. Based on the above, we established a national pesticide residue detection result database. The presented intelligent pesticide residue data analysis system establishes the link and communication among the raw detection data and the four basic sub-databases, provides individual and comprehensive statistics and analysis of multi-dimensional pesticide residue data, and automatically generates detection result reports that contain text and charts. By "one-button download", the detection result report could be generated within 30 minutes, which can't be achieved with traditional statistical methods.

Compared with the existing manual reports, the detection reports generated method in this invention not only has high accuracy, high speed, and diverse judgment criteria, but also has flexible statistical range and various analysis methods. The platform and method in this invention provide automation of online data acquisition, result judgment, statistical analysis, and report generation. They greatly improve the depth, accuracy and efficiency of data analysis, and are of great practical significance and commercial application value.

DESCRIPTION OF DRAWINGS

FIG. 7 shows the content of a pesticide residue detection report;

EMBODIMENTS

This invention will be presented in detail with reference to the accompanying drawings and embodiments.

Figure 1:
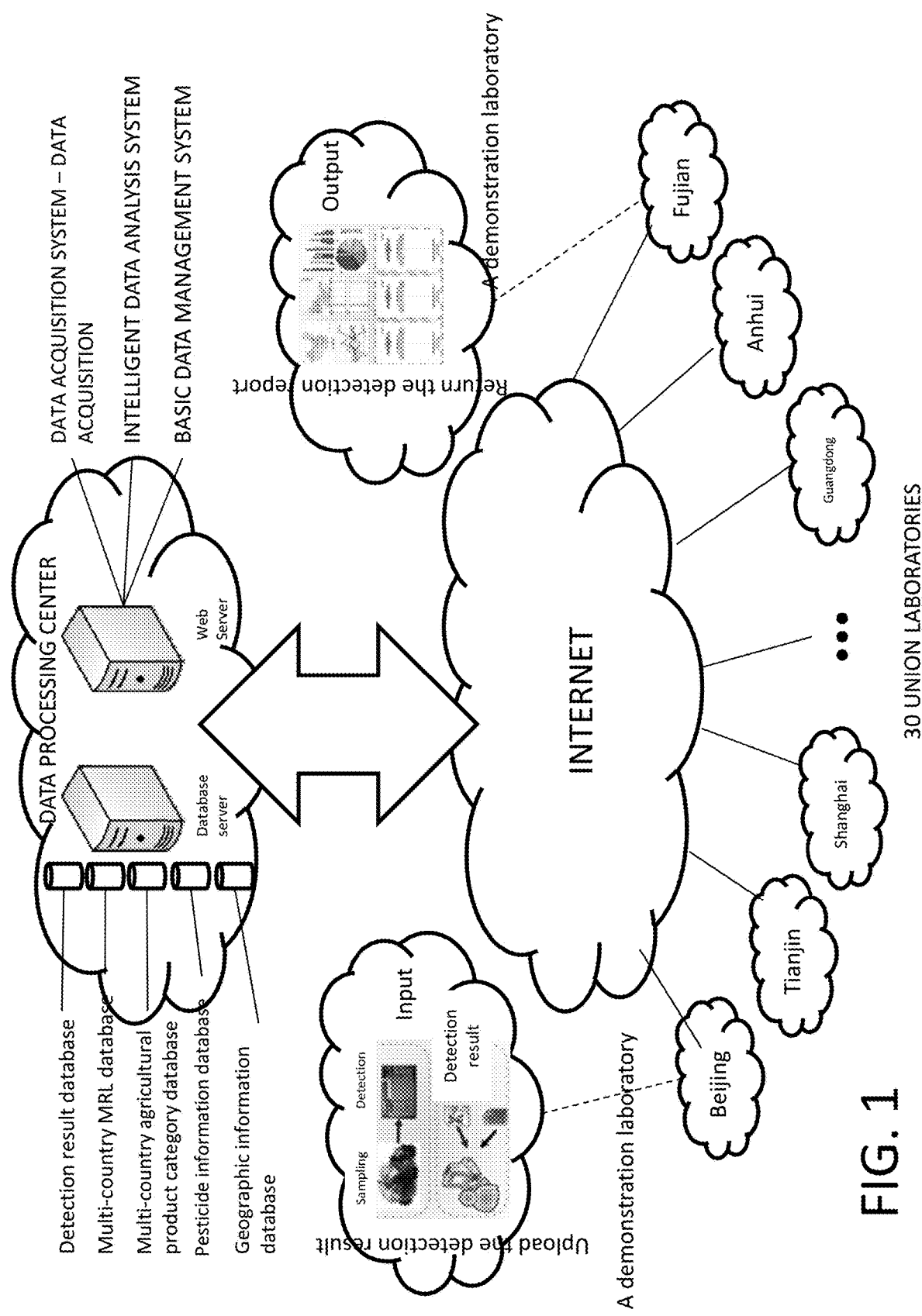
FIG. 1 shows the Internet pesticide residue detection data analysis platform across China.
Figure 2:
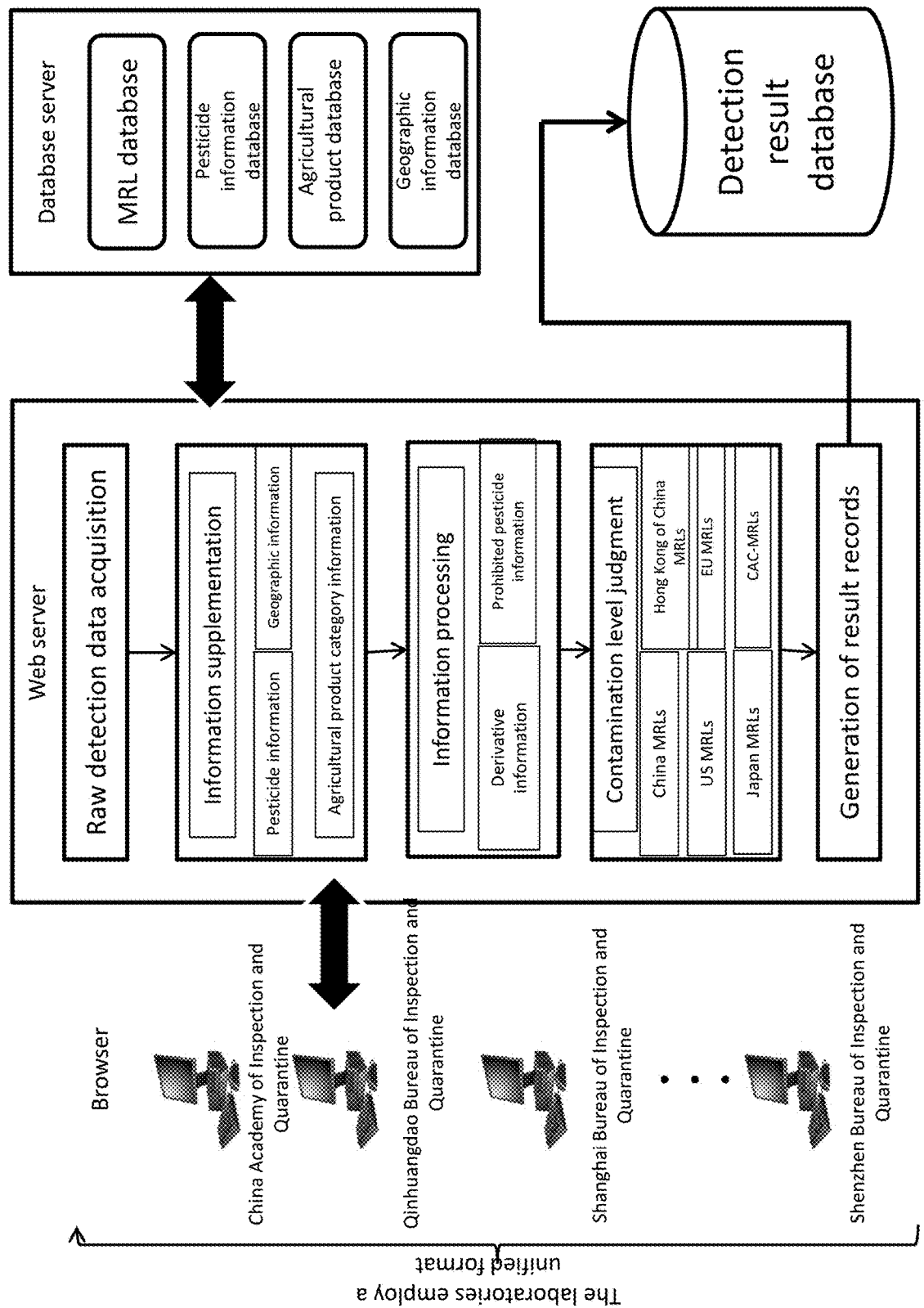
FIG. 2 shows the pesticide residue detection data acquisition system.

The Internet-based national big data technical platform of pesticide residue detection is shown in FIG. 1. It comprises four main parts: ① more than 30 Internet-based laboratories across the country; ② a coordinated laboratory detection result database and four basic sub-databases (a multi-country MRLs database, an agricultural product category database, a basic information of pesticide database, and a geographic information database); ③ a pesticide residue data acquisition system; ④ an intelligent pesticide residue analysis system. The last two parts constitute a data processing center. The working principle of the platform is shown below. The raw pesticide residue detection results are reported from clients in the coordinated laboratories distributed in the country to the acquisition system via Internet, as shown in FIG. 2. The acquisition system carries out the judgment of the contamination levels by data acquisition, information supplementation, derivative information merging, toxicity analysis, and according to the MRL standards in different countries, records the result, and stores the records into the detection result database. The intelligent analysis system sets and reads the data according to the criteria set by the users, performs statistical data analyses one by one according to statistical analysis models, generates charts, draws general conclusions and creates detection reports. Finally, it returns the analytical results to the clients in the coordinated laboratories for viewing and downloading, as shown in FIG. 1.

Table 1 shows the raw detection result database and four basic sub-databases (multi-country MRLs database, agricultural product category database, basic information of pesticide database, and geographic information database) established in more than 30 laboratories across the country. An associated data storage and query model established based on "MRL standards in several countries—categories of agricultural products—properties of more than one thousand pesticides" is proposed. Thus, linked basic pesticide residue data access and invocation is achieved, and a standard basis for judgment of the pesticide residue detection results is provided.

TABLE 1

Five main basic databases are established to provide a scientific basis for qualitative judgment of pesticide residue detection results in coordinated laboratories

| Pesticide information database ⇔ | Multi-country MRL criteria database ⇔ | Multi-country agricultural product category database ⇔ | Geographic information database ⇔ | Coordinated laboratories detection result database |
|---|---|---|---|---|
| ① Basic information<br>② Toxicity information<br>③ Function information<br>④ Chemical component<br>⑤ Prohibition information<br>⑥ Derivative information | ① China MRLs<br>② Hong Kong of China MRLs<br>③ US MRLs<br>④ EU MRLs<br>⑤ Japan MRLs<br>⑥ CAC MRLs | ① China categories<br>② Hong Kong of China categories<br>③ US categories<br>④ EU categories<br>⑤ Japan categories<br>⑥ CAC categories | ① 7 regions<br>② 34 provinces/cities/municipalities<br>③ 334 prefecture-level cities<br>④ 2,853 counties | ① Coordinated sampling<br>② Coordinated sample preparation<br>③ Coordinated detection<br>④ Coordinated format data uploading,<br>⑤ Coordinated format statistical analysis report |
| Pesticide property categories | 241,527 items of MRLs | 350 species of agricultural products | 2,853 counties in China | More than 1,200 pesticides commonly used in the world |

A pesticide residue data acquisition system is designed as shown in FIG. 2, and a national pesticide residue detection result database is established. A data integration and processing model consisting of "data acquisition—information supplementation—derivative consolidation—prohibited pesticide handling—contamination level judgment" is presented, which provides quick online acquisition and merging of pesticide residue detection result data, accurate judgment of the data according to MRLs from several countries and dynamic addition and real-time update of the pesticide residue detection result database is achieved, and provides scientific data for decision-making of food safety in the country. As shown in FIG. 2, the pesticide residue detection data acquisition system employs three-layer architecture based on browser/server. The coordinated laboratories are operated under five uniform specifications (uniform sampling, uniform sample preparation, uniform detection, uniform format data uploading, and uniform format statistical analysis report) in a closed system, utilizing Liquid Chromatography-Quadrupole-Time of Flight/Mass Spectrometry (LC-Q-TOF/MS) and Gas Chromatography-Quadrupole-Time of Flight/Mass Spectrometry (GC-Q-TOF/MS) techniques to report pesticide residue detection data that is detected in fruits and vegetables, which can fully guarantee the uniformity, integrality, accuracy, security, and reliability of data. The raw detection result data is acquired with ASP.NET technique to supply the information on pesticides, regions, and agricultural product categories merge derivatives and manage pesticide toxicity categorization. The result is judged contamination level according to the MRL criterion of the countries or regions or organizations and stored the generated records of results in the detection result database.

Figure 3:
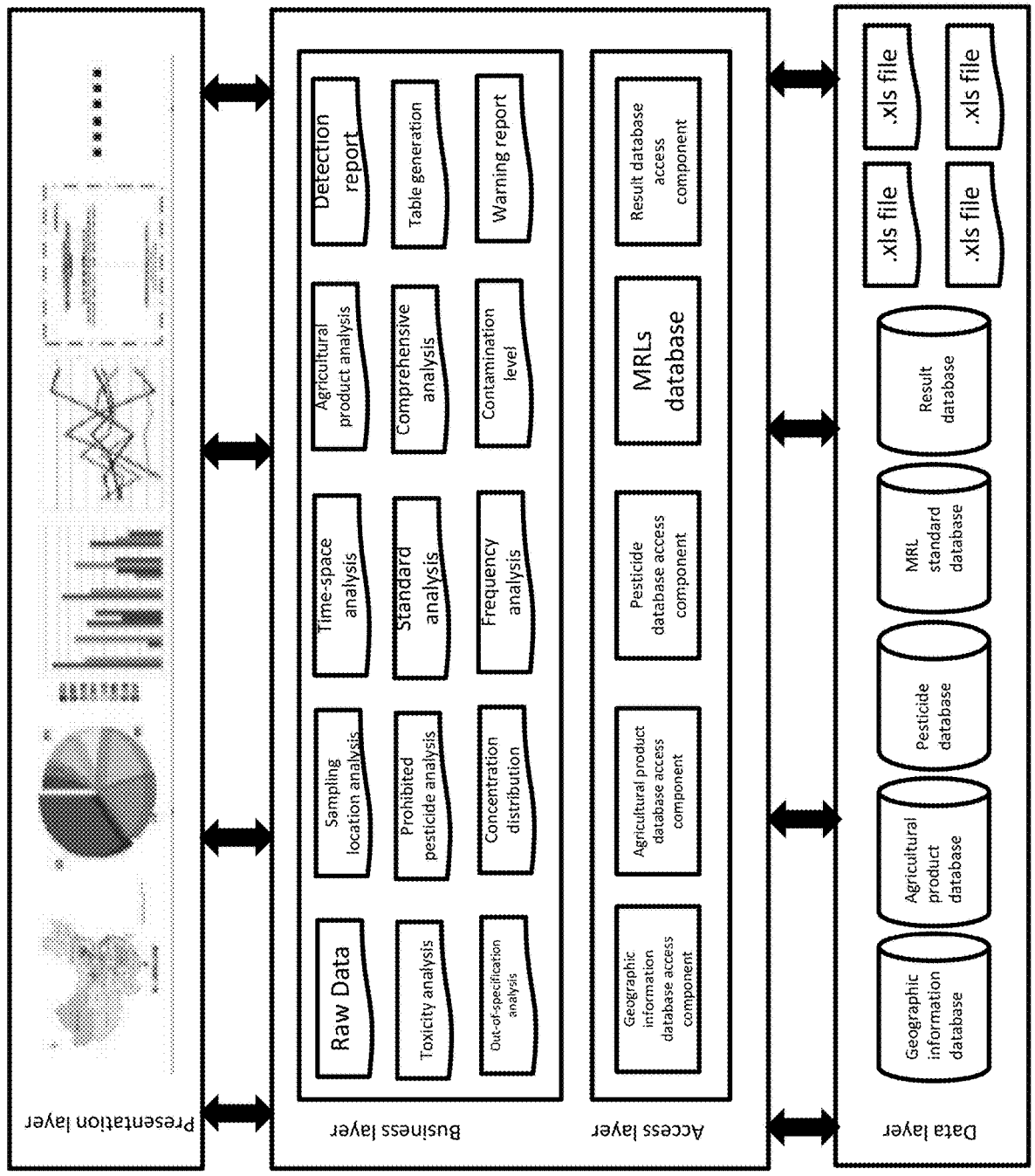
FIG. 3 shows the intelligent pesticide residue detection data analysis system.

An intelligent pesticide residue detection data analysis system is established as shown in FIG. 3. The intelligent analysis system comprises a presentation layer, a business layer, an access layer, and a data layer. The data layer consists of the detection result database, the four basic sub-databases, and relevant files, and is configured to provide database and file services. The access layer accesses the data in the databases via a database access component and provides the data to the business layer. The business layer realizes multi-dimensional statistical analysis of sampling locations, pesticides, and contamination levels according to the statistical analysis models. The presentation layer provides various intelligent analysis reports that contain text and charts according to the criterion set by a client. An online custom mode is established in the present invention to support the users to select and filter the statistical data autonomously, to highlight the data of interest or key data. Meanwhile it supports the user to customize the report type and range, to improve data presentation and big data analysis capability. It is realized that multi-dimensional automatic statistics of 20 pesticide residue indices including agricultural products, pesticides, regions, and MRLs in different countries, as shown in Table 2. Wherein, 31 different tables and 38 different figures can be generated automatically, and comprehensive assessment and warning information can be generated automatically according to the statistical results. Finally, a pesticide residue detection report that contains text and charts can be generated automatically within 30 minutes by "one-button download", as shown in FIG. 4.

Figure 4:
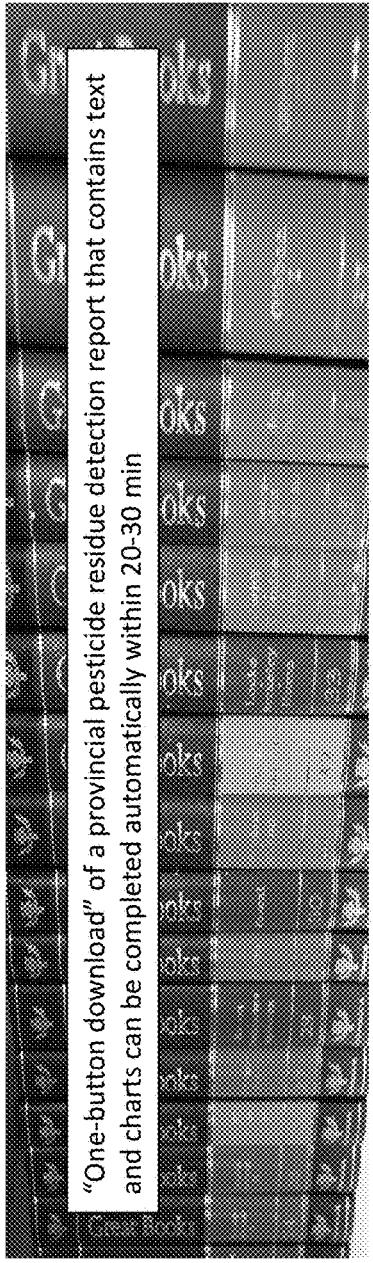
FIG. 4 shows an automatically generated pesticide residue detection report.

FIG. 4 shows the result of multi-discipline multi-element pesticide residue big data integration technique based on ternary interdisciplinary integration technique of high-resolution mass spectrometry, Internet, and data science. "One-button download" is realized, and a detection report that contains texts and charts can be generated within 30 minutes. The pesticide residue detection report reflects 20 regular characteristics of pesticide residues in more than 150 species of fruits and vegetables in 18 categories in 31 provincial capitals/municipalities in the country, as shown in Table 2.

TABLE 2

20 regular characteristics of pesticide residues discovered through big data statistical analysis (1) It is found that pesticide residues exist almost in most fruits and vegetables from 31 provincial capitals/municipalities. The pesticide residue detection rate is 39%-88% (LC-Q-TOFMS) or 54%-97% (GC-Q-TOFMS).

(2) Altogether 517 pesticides are detected in more than 150 species of fruits and vegetables in 18 categories (wherein, 93 pesticides are detected with both techniques) in China;

(3) It is found that the pass rate of pesticide residues in fruits and vegetables from 31 provincial capitals/municipalities is 96.3%-98.7%, which means that the safety level is assured essentially;

(4) The normal characteristics of pesticide residue detection levels (1-5, 5-10, 10-100, 100-1,000, greater than 1,000 μg/kg) in our country are determined (by comparison with MRLs in China, EU, and Japan, etc.);

(5) The normal characteristics of detected pesticide species in individual samples (not found, 1 species, 2-5 species, 6-10 species, more than 10 species) in our country are determined;

(6) The normal characteristics of detected pesticide species in the same category of samples (not detected, 1 species, 2-5 species, 6-10 species, more than 10 species) in our country are determined;

(7) The normal characteristics of pesticide functions (insecticides, bactericides, herbicides, plant growth regulators, synergistic agents, and other species, and their proportions) in our country are determined;

(8) The normal characteristics of toxicity of pesticides in our country (species of pesticides of slightly toxic, low toxic, slightly low toxic, moderately toxic, highly toxic, vitally toxic, and prohibited, and their proportions) are determined;

(9) The order of pesticide species detected throughout the country and in the provincial capitals and the order of frequencies of detection are determined, revealing the differences in pesticide application in fruits and vegetables among different regions throughout the country;

(10) The order of safety ("exceeding", "detected but not exceeding", "not detected") of the detected pesticides throughout the country and in the provincial capitals is determined (by comparison with MRL standards in China, EU, and Japan);

(11) It is found that the MRLs in China is confronted with a challenge of lower level and less quantity when compared with MRLs in developed countries such as USA, EU, and Japan;

(12) It is found that only 40% of the massive residue data in the general investigation is used according to the China MRLs, while the application ratio of the data is as high as 95% or above in EU and Japan; consequently,

(13) Top 10 species of fruits and vegetables in which the quantities of pesticide species are the largest and the order of follow-up fruits and vegetables are determined; it is found that the common fruits and vegetables are contaminated severely.

(14) Top ten species of fruits and vegetables in which the average detected frequency of pesticides is the highest and the order of the follow-up fruits and vegetables are determined;

(15) The species of highly toxic, vitally toxic, and prohibited pesticides and the detection frequencies are determined;

(16) Top ten fruits and vegetables in which the quantities of highly toxic, vitally toxic, and prohibited pesticides are the largest and the order of follow-up fruits and vegetables are determined;

(17) Top ten fruits and vegetables in which the detected frequency of highly toxic, vitally toxic, and prohibited pesticides is the highest and the order of follow-up fruits and vegetables are determined;

(18) The general characteristics of and the differences in the existence of pesticides in the commercial fruits and vegetables in 31 provincial capitals/municipalities are determined;

(19) The characteristics of and the differences in the pesticides detected at the sampling locations in 31 provincial capitals/municipalities are determined;

(20) The characteristics of and the differences in the use of pesticides in 31 provincial capitals/municipalities are determined.

Figure 5:
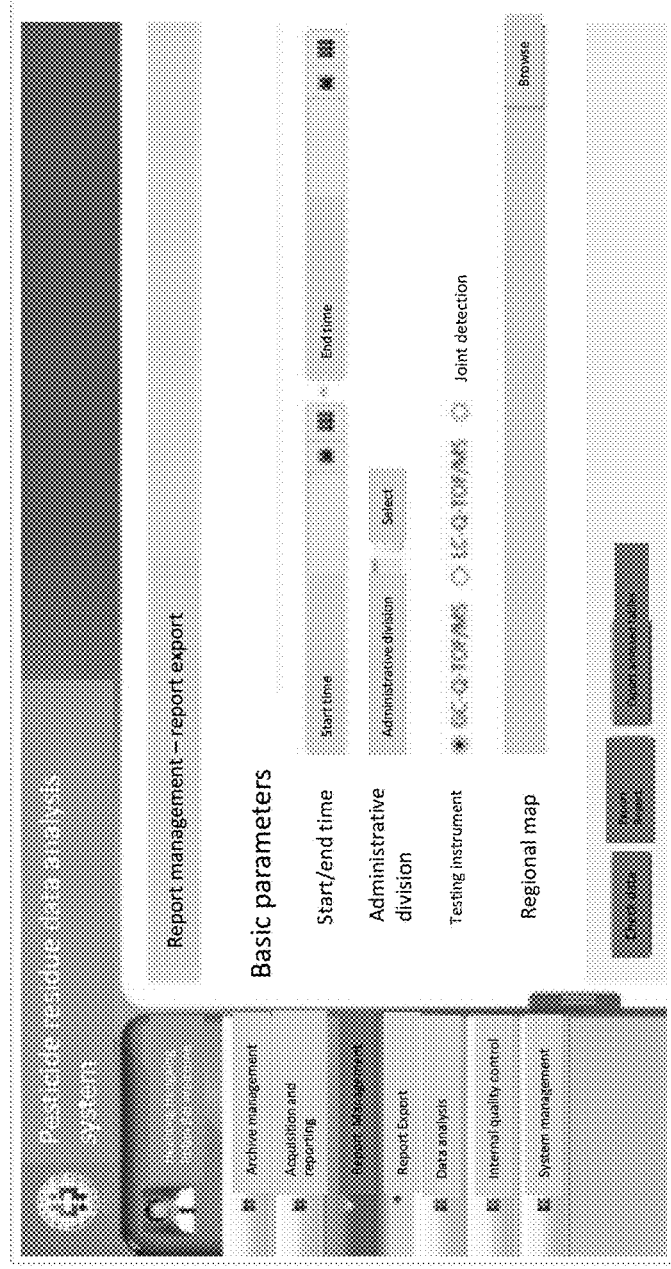
FIG. 5 shows a parameter selection interface for automatic export of pesticide residue detection report.
Figure 6:
FIG. 6 shows the five-level tree structure of administrative divisions for pesticide residue detection reports.
Figure 9:
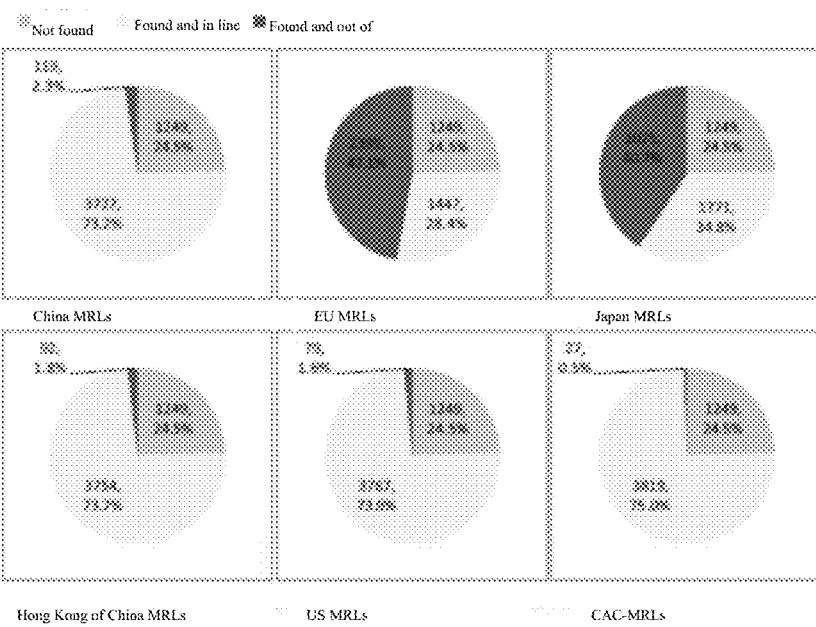
FIG. 9 shows measurement of sample safety level according to the MRL standards of several countries, regions, or international organizations.
Figure 10:
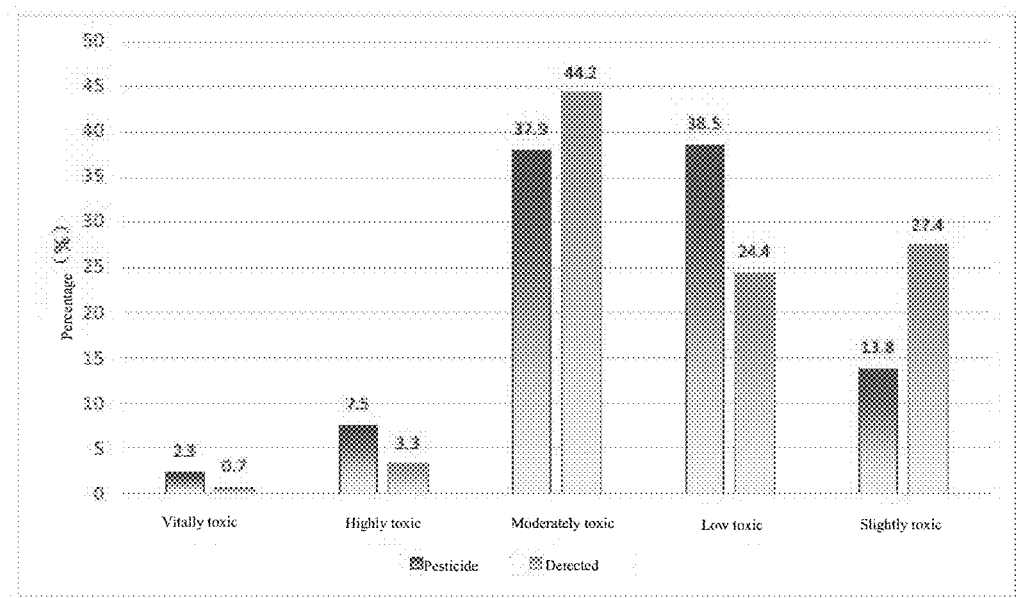
FIG. 10 shows the toxicity categories and percentages of detected pesticides.
Figure 11:
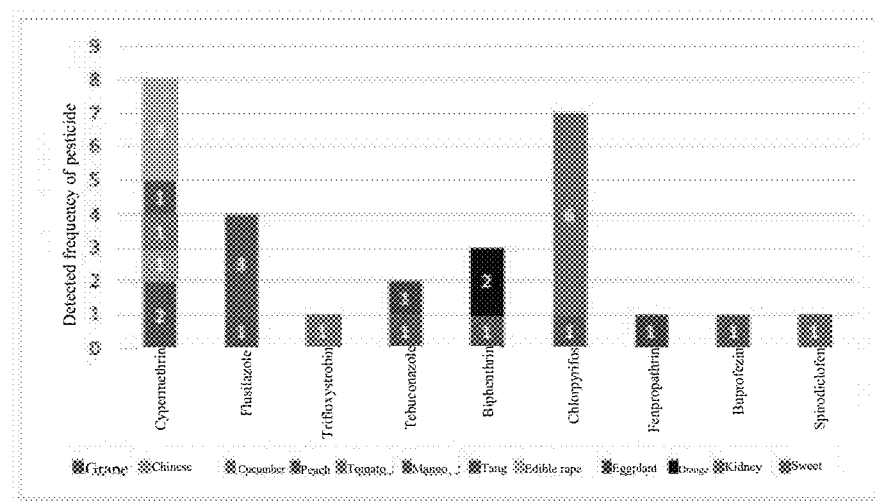
FIG. 11 shows the species and frequencies of pesticides exceeding CAC-MRLs.

The download parameters of pesticide residue detection result report are shown in FIG. 5. The sampling period and type can be selected freely. One or more administrative divisions can be selected at will (a five-level architecture of "national—regional—provincial—city—county" can be achieved) as shown in FIG. 6. User can select the type of the testing instrument and export the body part or the annexed tables of the report as required. The content of the body part of a local report consists of 5 chapters, as shown in FIG. 7. The report of detection result includes various charts to help the user visually understand statistic results. For example, reflecting the detection rates of pesticide residues in fruits and vegetables from 31 provincial capitals/municipalities (see FIG. 8). Pie charts that reflect the safety levels of the detected samples, are shown in FIG. 9. Toxicity categories of detected pesticides and their proportions, are shown in FIG. 10. And bar charts that are used for out-of-specification analysis of specific samples (see FIG. 11), etc. There are 20 annexed tables which could be selected in the report. They record the raw detection results and detail statistics of concentration distribution, contamination levels, and out-of-specification (MRLs) of detected pesticide residues.

A report may contain words ranging from tens of thousands of words to hundreds of thousands of words depending on the data size, and the body part and the annexed tables may contain text and charts. Such a report may be generated and downloaded by "one-button download" within 30 minutes. Thus, the analysis and reporting ability to the massive pesticide residue data is greatly improved. Besides, the automatic reporting system further supports customization and extension of report structure and content.

Example of analysis report: the pesticide residue detection result database now contains 13.74 million detection data items of 22,368 batches samples of more than 140 specifies of fruits and vegetables from 638 sampling spots in 31 provincial capitals/municipalities (including 284 counties)

in the country, which is stored in 10 laboratories in the country, 145 million high-resolution mass spectra are collected, and pesticide residue detection reports containing 25 million words in total are formed.

Figure 8:
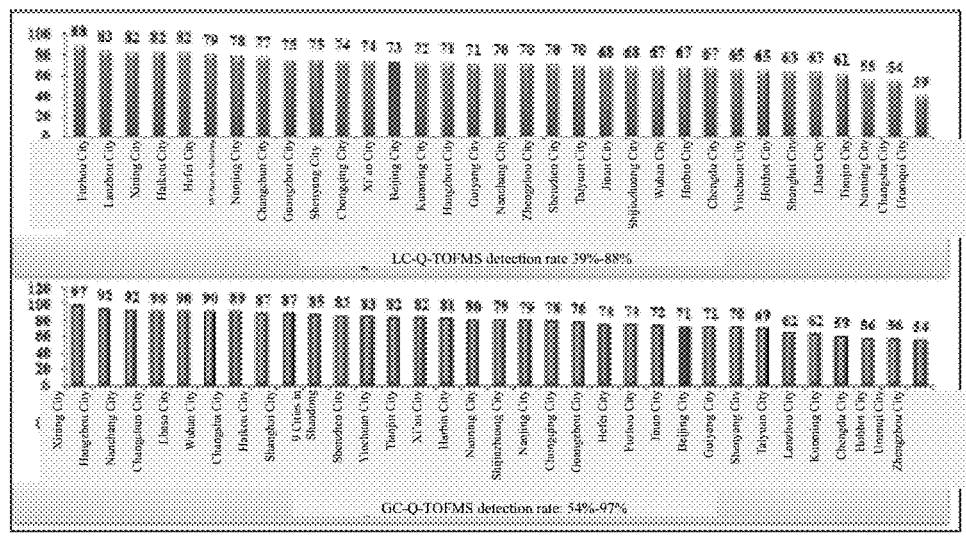
FIG. 8 shows the detection rates of pesticide residues in fruits and vegetables from 31 provincial capitals/municipalities markets in 2012-2015.

The basic information of pesticide residues in fruits and vegetables from 31 provincial capitals/municipalities in the country has been investigated preliminarily, as shown in FIG. 8, Tables 3 and 4. The further general investigation of the basic situation of pesticide residues in fruits and vegetables from Beijing, Tianjin, and Hebei in 2016 is similar to that of pesticide residues in fruits and vegetables in 31 provincial capitals/municipalities in 2012-2015.

TABLE 3

Basic information of pesticide residues in fruits and vegetables from 31 provincial capitals/municipalities (2012-2015)

| Item | LC-Q-TOF/MS | GC-Q-TOF/MS | |
|---|---|---|---|
| Detected pesticide species/frequency | 174/25448 | 343/20418 | |
| Range of pesticide residue detection rate | 39.3%-88.0% | 28.6%-100% | |
| Total number of pesticide species/frequencies detected by both techniques | 424 species/45,866 times | Total number of pesticide species detected by both techniques | 93 species |

TABLE 4

Basic information of pesticide residues in fruits and vegetables from Beijing, Tianjin, and Hebei (2016)

| Item | LC-Q-TOF/MS | GC-Q-TOF/MS | |
|---|---|---|---|
| Detected pesticide species/frequency | 161/9724 | 197/9834 | |
| Range of pesticide residue detection rate | 20.0%-100.0% | 50.0%-100.0% | |
| Total number of pesticide species/frequencies detected by both techniques | 279 species/19,558 times | Total number of pesticide species detected by both techniques | 56 species |

It is shown in Table 3 that in the 22,368 samples from 31 provincial capitals/municipalities in 2012-2015, totally 517 pesticides were detected (wherein, 93 pesticides were detected by both techniques), and the detected frequency was 45,866 times. It is listed in Table 4 that in the 10,190 samples from Beijing, Tianjin, and Hebei in 2016, totally 227 pesticides were detected, and the detected frequency was 19,558 times. It is found in the big data analysis for the general investigation from 31 provincial capitals/municipalities in 2012-2015 and the general investigation from Beijing, Tianjin, and Hebei in 2016 that the safety level of commercial fruits and vegetables in China was essentially assured, at 97% or above pass rate according to the China MRL standards. However, the pesticide residue problem was still severe. It is found in the big data statistical analysis: ① highly toxic or vitally toxic pesticides (e.g., Carbofuran, Isocarbophos, and Methidathion) and prohibited pesticides (e.g., Thimet, Ethoprophos) were still detected frequently, and the detection frequency is 5.5% of the total detection frequency; ② there are about 2.9% samples in which the pesticide residues were exceeding MRLs; ③ there are about 0.7%; individual samples in which more than 10 pesticide residues were found ④ the quantity of pesticide residue species detected in single specie of fruits and vegetables was 30 or more, and was even about 100 pesticides at the most; ⑤ The detection rates of pesticide residues in common fruits (grape, apple, pear and peach) and vegetables (celery, tomato, cucumber and sweet pepper) were high, and the phenomena of exceeding MRLs were severe, shown in Tables 5 and 6; ⑥ comparing with the MRL standards in advanced countries, the pesticide residue MRLs in China are confronted with a challenge of lower quantity and lower threshold. For example, in the 9,834 detected times of pesticide residues in the general investigation (GC-Q-TOF/MS) from Beijing, Tianjin, and Hebei in 2016, there are only 2,233 corresponding MRL items in the China MRL standards, which is 22.7%. China MRL standards are the lowest among all of the 6 MRL standards, which are much lower than the MRL standards in EU and Japan.

TABLE 5

Detection results of pesticide residues in 4 types of fruits (grape, apple, pear and peach) and 4 types of vegetables (celery, tomato, cucumber, and sweet pepper)

| | LC-Q-TOF/MS | | | | GC-Q-TOF/MS | | | |
|---|---|---|---|---|---|---|---|---|
| Sample | Total number of samples | Number of samples in which pesticides are detected | Pesticide detection rate, % | Number of pesticide species in which pesticides are detected | Sample | Total number of samples | Number of samples in which pesticides are detected | Pesticide detection rate, % | Number of pesticide species in which pesticides are detected |
| Grape | 411 | 367 | 89.3 | 75 | Grape | 389 | 316 | 85.6 | 1 |
| Apple | 628 | 579 | 92.2 | 61 | Peach | 279 | 234 | 83.9 | 83 |
| Pear | 574 | 397 | 69.2 | 52 | Pear | 437 | 349 | 79.9 | 91 |
| Celery | 537 | 479 | 89.2 | 87 | Celery | 353 | 341 | 96.6 | 132 |
| Tomato | 621 | 547 | 88.1 | 81 | Cucumber | 343 | 381 | 87.8 | 112 |
| Cucumber | 591 | 548 | 92.7 | 76 | Sweet pepper | 369 | 292 | 79.1 | 104 |

TABLE 6

MRL analysis of three categories of pesticide residues in 4 types of fruits (grape, apple, pear and peach) and 4 types of vegetables (celery, tomato, cucumber, and sweet pepper)

| | LC-Q-TOF/MS | | | | GC-Q-TOF/MS | | |
| --- | --- | --- | --- | --- | --- | --- | --- |
| Sample | Number of out-of specification pesticides according to China MRL standards | Number of out-of specification pesticides according to EU MRL standards | Number of out-of specification pesticides according to Japan MRL standards | Sample | Number of out-of specification pesticides according to China MRL standards | Number of out-of specification pesticides according to EU MRL standards | Number of out-of specification pesticides according to Japan MRL standards |
| Grape | 9 | 24 | 25 | Grape | 3 | 24 | 33 |
| Apple | 3 | 17 | 11 | Peach | 3 | 23 | 30 |
| Pear | 4 | 11 | 9 | Pear | 2 | 24 | 33 |
| Celery | 7 | 45 | 36 | Celery | 8 | 69 | 88 |
| Tomato | 5 | 21 | 21 | Cucumber | 5 | 32 | 37 |
| Cucumber | 8 | 22 | 22 | Sweet pepper | 2 | 19 | 37 |

The above detailed description is provided only to describe some feasible embodiments of the present invention rather than to limit the protection scope of the present invention. Any equivalent embodiment or modification implemented without departing from the spirit of the present invention shall be deemed as falling in the protection scope of the present invention.

The invention claimed is:

1. A computerized, network-enabled pesticide residue detection data platform receiving data inputs based on high-resolution mass spectrometry, Internet, and data science including laboratory coordination, a coordinated laboratory detection result database and four basic sub-databases, a data acquisition system, and an intelligent data analysis system, wherein, the coordinated laboratory includes a plurality of individual coordinated standard laboratories established across the country, which are operated under five uniform specifications in a closed system and detect pesticide residues in fruits and vegetables on the market throughout the country all year;

the coordinated laboratory detection result database is in electronic communication with the individual coordinated standard laboratories of the coordinated laboratory and contains names of pesticides, names of agricultural products, sampling times, sampling locations, detection methods, and detection organizations; the four basic sub-databases comprise a multi-country MRL (maximum residue limit) database, an agricultural product category database, a pesticide information database, and a geographic information database, wherein the MRL database has an associated MRL query model to link pesticide residue data from the individual coordinated standard laboratories and provide a standard basis for judgment of pesticide residue detection results;

the data acquisition system operated within a network-connected centralized web server, the data acquisition automatically uploading the detection result, data pre-processing, and contamination level judgment, to establish a national pesticide residue detection result database based on data transmitted from the individual coordinated standard laboratories;

the data acquisition system comprising modules, wherein the data acquisition module acquires the pesticide residue detection results reported by the coordinated laboratories, processes the reported detection data, including judgment of the reported data, and supplementation, categorization, and merging of information related to pesticides, regions, and agricultural product categories, judges contamination levels according to the MRLs of different countries or regional organizations, and stores records of final results into the databases, whereby merging of the information related to pesticides, regions, and agricultural product categories further comprises merging derivatives of the pesticides, regions, and agricultural product categories reported by the coordinated laboratories to manage pesticide toxicity categorization;

the intelligent data analysis system operated within the network-connected centralized web server, the intelligent data analysis system linking and communicating data between the detection result database and the four basic sub-databases, to provide multi-dimensional cross analysis of sampling locations, pesticides, agricultural products, and contamination levels according to statistical analysis models, sets and read data, and to carry out statistical analyses according to the statistical analysis models on criteria set by users of the system, to generate charts, draw comprehensive conclusions, provides detection reports, and to return data of the analytical results to users in the individual coordinated laboratories through a network connection, whereby users in the individual coordinated laboratories can view and download the data of the analytical results;

the intelligent data analysis system compries modules, the intelligent data analysis system providing interface and channel of parameter set by the users, providing itemized statistics of several items, providing comprehensive analysis tasks of several items based on individual analysis results of a single item analysis, generating detection reports that contain text and charts from the analytical results, generating various statistical tables, and providing warning prompts according to the analytical results;

the intelligent data analysis system includes a presentation layer, a business layer, an access layer, and a data layer; wherein the data layer consists of the detection result database, the four basic sub-databases, and relevant files, and provides database and file services; the access layer accesses the data in the databases via a database access component and to provide the data to the business layer; the business layer provides multi-dimensional statistical analysis of sampling locations, pesticides, and contamination levels according to the statistical analysis models; and the presentation layer provides various intelligent analysis reports that contain text and charts according to several criteria set by the client.

2. The pesticide residue detection data platform according to claim 1, wherein, the multi-country MRLs database includes 241,527 items of MRL standard items from China MRL, Hong Kong of China MRL, US MRL, EU MRL, Japan MRL, and Codex Alimentarius Commission (CAC) MRL standards, targeted pesticides, agricultural products, permitted MRLs, and the standard establishment countries/regions/organizations.

3. The pesticide residue detection data platform according to claim 1, wherein, the agricultural product category database comprises standards of China categorization, Hong Kong of China categorization, US categorization, EU categorization, Japan categorization, and Codex Alimentarius Commission (CAC) categorization.

4. The pesticide residue detection data platform according to claim 3, wherein, the agricultural product category database includes names of agricultural products, primary category information, secondary category information, and tertiary category information.

5. The pesticide residue detection data platform according to claim 1, wherein, the pesticide information database contains basic information, toxicity information, function information, chemical composition, prohibition information, and derivative information.

6. The pesticide residue detection data platform according to claim 5, wherein, the pesticide information database specifically comprises names of detected pesticides, CAS registry number of the pesticides, toxicity intensities of the pesticides, whether the pesticides are metabolic products and their metabolic precursors or not, and whether the pesticides are prohibited in the standards or not.

7. The pesticide residue detection data platform according to claim 1, wherein, the geographic information database covers geographical areas, and comprises detailed address of sampling locations in provincial administrative division, regional administrative division, and county-level administrative division.

8. The pesticide residue detection data platform according to claim 1, wherein, the data acquisition system is implemented on the basis of three-layer architecture consisting of browsers, a Web server, and a database server, wherein the browsers are located in the individual coordinated laboratories and are interfaces for users to access the system; the Web server is located in a data center accesses the databases and executing preprocessing logics; and the database server is located in the data center and stores and manages various pesticide residue data.

9. The pesticide residue detection data platform according to claim 1, wherein, the intelligent data analysis system is implemented on the basis of three-layer architecture consisting of browsers, a Web server, and a database server; the browsers are located in the individual coordinated laboratories throughout the country, and are interfaces for the users to access the system, set statistical parameters, and download statistical results; the Web server is also located in the data center and accesses the databases and executing various statistical analysis logics; and the database server is located in the data center and stores and manages various pesticide residue data.

10. The pesticide residue detection data platform according to claim 1, wherein, the five uniform specifications include uniform sampling, uniform sample preparation, uniform detection method, uniform format data uploading, and uniform format statistical analysis report.

11. An automatic pesticide residue detection report generation method using the pesticide residue detection data platform according to claim 1, comprising: reporting raw pesticide residue detection results to the data acquisition system from the individual coordinated laboratories distributed in the country over Internet; the data acquisition system carries out the judgment of contamination levels by data acquisition, information supplementation, derivative information merging, and toxicity analysis, and according to the MRL standards in different countries, records the results, and stores the records of results into the detection result database; the intelligent analysis system sets and reads the data according to the criteria set by the users, then performs statistical analyses of the data one by one according to statistical analysis models, generates charts, draws comprehensive conclusions, generates detection reports, and returns the analytical results to the users in the individual coordinated laboratories.

12. The automatic pesticide residue detection report generation method according to claim 11, wherein, the union laboratories detect pesticide residues by Liquid Chromatography-Quadrupole-Time of Flight/Mass Spectrometry (LC-Q-TOF/MS) and Gas Chromatography-Quadrupole-Time of Flight/Mass Spectrometry (GC-Q-TOF/MS) and report pesticide residue detection data that is detected all year.

13. The automatic pesticide residue detection report generation method according to claim 11, further comprising: setting up an online custom mode in the intelligent analysis system to support the users to select and filter the statistical data autonomously, to highlight the data of interest or key data, and to support the users to customize the type and range of report.

* * * * *